(12) United States Patent
Olmos-Calderon (10) Patent No.: US 10,288,987 B2
(45) Date of Patent: May 14, 2019

(54) TRIPOD ACCESSORY CLAMP (71) Applicant: Moises H Olmos-Calderon, Denver, CO (US)

(72) Inventor: Moises H Olmos-Calderon, Denver, CO (US)

( * ) Notice: Subject to any disclaimer, the term of this patent is extended or adjusted under 35 U.S.C. 154(b) by 0 days.

(21) Appl. No.: 15/832,969

(22) Filed: Dec. 6, 2017

(65) Prior Publication Data

US 2018/0164662 A1     Jun. 14, 2018

Related U.S. Application Data (60) Provisional application No. 62/431,930, filed on Dec. 9, 2016.

(51) Int. Cl.
| | |
|---|---|
| *F16M 11/04* | (2006.01) |
| *F16M 11/10* | (2006.01) |
| *F16M 11/24* | (2006.01) |
| *F16M 13/00* | (2006.01) |
| *G03B 17/56* | (2006.01) |

(52) U.S. Cl.
CPC ........... *G03B 17/561* (2013.01); *F16M 11/04* (2013.01); *G03B 17/566* (2013.01); *F16M 11/041* (2013.01); *F16M 11/10* (2013.01); *F16M 11/24* (2013.01); *F16M 13/00* (2013.01)

(58) Field of Classification Search
CPC ...................................................... G03B 17/56
USPC ........................................................ 396/419
See application file for complete search history.

(56) References Cited

U.S. PATENT DOCUMENTS

| | | | | |
|---|---|---|---|---|
| 1,468,091 A | * | 9/1923 | Thalhammer | G03B 9/08 352/91 C |
| 2,221,030 A | * | 11/1940 | Mihalyi | G03B 17/04 359/827 |
| 2,706,610 A | * | 4/1955 | Roberts | F21L 15/08 248/168 |
| 2,755,053 A | * | 7/1956 | Sloane | F16M 11/18 248/179.1 |
| 2,771,826 A | * | 11/1956 | Shapiro | F16M 13/04 224/257 |
| 3,002,663 A | * | 10/1961 | Fernelius | F16M 13/04 224/908 |
| 3,782,671 A | * | 1/1974 | Igwe | F16M 11/10 248/183.4 |
| 4,317,552 A | * | 3/1982 | Weidler | F16M 11/16 211/203 |
| 4,327,986 A | * | 5/1982 | Carter | F16M 13/04 396/423 |
| 4,621,785 A | * | 11/1986 | Embra | F16M 11/28 248/565 |

(Continued)

*Primary Examiner* — Clayton E. LaBalle
*Assistant Examiner* — Kevin C Butler
(74) *Attorney, Agent, or Firm* — Patent Law Offices of Rick Martin, P.C.

(57) ABSTRACT

A tripod has a standard mesh and thread fitting for an adjustment handle. This invention bolts a bracket into the standard mesh and thread fitting. Then a cylindrical extension post is bolted into the bracket. Then a clamp base with an integral clamp is bolted onto the extension post. The clamp can secure an umbrella, a light, a telescoping mount for a smart phone and any number of photographer accessories. The handle is repositioned on a distal end of the bracket, so the tripod can be moved as it originally was with the handle.

18 Claims, 10 Drawing Sheets

(56) References Cited

U.S. PATENT DOCUMENTS

| | | | | |
|---|---|---|---|---|
| 4,736,217 A * | 4/1988 | McDowell | F16M 11/105 | 396/428 |
| 4,907,769 A * | 3/1990 | Hunley, Jr. | F21V 21/06 | 248/122.1 |
| 5,005,030 A * | 4/1991 | Wells | F16M 13/04 | 352/243 |
| 5,081,478 A * | 1/1992 | Hayashida | F16M 11/10 | 248/187.1 |
| 5,275,364 A * | 1/1994 | Burger | F16L 3/00 | 248/125.1 |
| 5,288,044 A * | 2/1994 | Chen | F16M 11/2014 | 248/183.1 |
| 5,347,740 A * | 9/1994 | Rather | F41C 27/00 | 396/426 |
| 5,462,214 A * | 10/1995 | Buswell | A45C 11/38 | 224/242 |
| 5,632,459 A * | 5/1997 | Brett | F16M 11/14 | 248/122.1 |
| 5,772,164 A * | 6/1998 | Shen | F16M 11/14 | 248/168 |
| 5,819,461 A * | 10/1998 | Killian | F16M 13/04 | 42/94 |
| 5,829,652 A * | 11/1998 | Denzer | A45F 3/14 | 224/270 |
| 6,042,277 A * | 3/2000 | Errington | G03B 15/05 | 248/187.1 |
| 6,116,554 A * | 9/2000 | Wei | F16M 11/105 | 248/183.1 |
| 6,149,112 A * | 11/2000 | Thieltges | B60R 11/04 | 224/908 |
| D463,877 S * | 10/2002 | Kung | D26/38 | |
| 6,877,915 B1 * | 4/2005 | Wei | F16M 11/105 | 348/143 |
| 7,551,225 B2 | 6/2009 | Overstreet | F16M 11/041 | 248/187.1 |
| 8,152,389 B1 * | 4/2012 | Lammens | F16M 11/10 | 396/419 |
| 9,360,744 B2 * | 6/2016 | Dering | G03B 17/561 | |
| 9,480,326 B2 * | 11/2016 | Stephens | F16M 13/04 | |
| 2001/0017339 A1 * | 8/2001 | Brotz | F16M 11/14 | 248/187.1 |
| 2002/0056792 A1 * | 5/2002 | Ibrahim | F16M 11/34 | 248/163.1 |
| 2003/0067771 A1 * | 4/2003 | Kung | F21V 21/06 | 362/191 |
| 2004/0155159 A1 * | 8/2004 | Tiffen | F16M 11/32 | 248/177.1 |
| 2004/0263679 A1 * | 12/2004 | Wei | H04N 5/225 | 348/373 |
| 2006/0082321 A1 * | 4/2006 | Van Deursen | F16M 11/16 | 315/200 A |
| 2006/0175485 A1 * | 8/2006 | Cramer | B07B 1/15 | 248/184.1 |
| 2006/0197001 A1 * | 9/2006 | Parker | F16M 11/10 | 248/230.8 |
| 2006/0231713 A1 * | 10/2006 | Crain | G01C 15/00 | 248/309.1 |
| 2006/0231714 A1 * | 10/2006 | Crain | G01C 15/00 | 248/309.1 |
| 2006/0233601 A1 * | 10/2006 | Crain | E06O 7/14 | 403/300 |
| 2007/0107170 A1 * | 5/2007 | Killip | A45B 25/00 | 24/346 |
| 2007/0177866 A1 * | 8/2007 | Fujimoto | G03B 17/38 | 396/376 |
| 2008/0142654 A1 * | 6/2008 | Clampitt | F16M 11/10 | 248/187.1 |
| 2008/0247746 A1 * | 10/2008 | Law | F16M 11/041 | 396/419 |
| 2009/0020066 A1 * | 1/2009 | Strom | B63B 17/00 | 114/364 |
| 2009/0178699 A1 * | 7/2009 | O'Donnell | A45B 1/00 | 135/16 |
| 2009/0250567 A1 * | 10/2009 | Raynaud | F16M 11/16 | 248/168 |
| 2009/0256035 A1 * | 10/2009 | McKay | F16M 11/10 | 248/179.1 |
| 2009/0263118 A1 * | 10/2009 | McKay | G03B 17/00 | 396/421 |
| 2010/0254696 A1 * | 10/2010 | McKay | F16M 13/04 | 396/420 |
| 2011/0006170 A1 * | 1/2011 | Liu | F16M 11/041 | 248/121 |
| 2011/0129210 A1 * | 6/2011 | McGucken | F16M 13/02 | 396/422 |
| 2013/0094196 A1 * | 4/2013 | Wessel | F21L 4/04 | 362/198 |
| 2014/0103181 A1 * | 4/2014 | Duerigen | F16M 11/041 | 248/289.11 |
| 2014/0209777 A1 * | 7/2014 | Klemin | F16M 13/04 | 248/544 |
| 2015/0076296 A1 * | 3/2015 | Yang | F16M 11/041 | 248/163.2 |
| 2015/0137544 A1 * | 5/2015 | Graham | G03B 17/563 | 294/139 |
| 2015/0286115 A1 * | 10/2015 | Koch | B62J 11/00 | 248/615 |
| 2016/0258572 A1 * | 9/2016 | Ben Meir | G03B 17/561 | |
| 2017/0175949 A1 * | 6/2017 | Cardozo | F16M 13/02 | |
| 2017/0239111 A1 * | 8/2017 | Hurtado Matinez | A61G 5/10 | |
| 2018/0059516 A1 * | 3/2018 | Taylor | G03B 17/00 | |
| 2018/0132897 A1 * | 5/2018 | Shiner | A61B 17/6466 | |

\* cited by examiner

TRIPOD ACCESSORY CLAMP

CROSS REFERENCE APPLICATIONS

This application is a non-provisional application claiming the benefits of provisional application No. 62/431,930 filed 2016 Dec. 9.

FIELD OF INVENTION

The present invention relates to attaching a clamp fixture onto a camera tripod or monopod to enable support of accessories such as an umbrella.

BACKGROUND OF THE INVENTION

Historically when a photographer shoots an outdoor event like a football game, he often needs an assistant to hold a protective umbrella over his head. Sometimes he needs an assistant to hold a flash attachment. Sometimes he needs an assistant to hold an iPad® or a smart phone in front of him. Sometimes he may want to hold his camera several feet higher than his tripod.

What is needed in the art is a versatile clamping device that can replace an assistant holding accessories and can also support a camera above a tripod. The present invention meets these needs by providing a lateral brace that screws into a prior art fixture on a prior art tripod base. Attached to the lateral brace is a rotatable clamp that can hold an umbrella, light, an iPad®, a smart phone, or a portable TV. A tripod angle adjusting arm is also screwed into the device.

SUMMARY OF THE INVENTION

The main aspect of the present invention is to provide a brace for a standard tripod that screws into the standard receptacle for the tripod swivel adjust arm, wherein the brace can support a clamp to hold an umbrella or another accessory.

Another aspect of the present invention is to provide a receptacle for the standard tripod swivel adjust arm.

Another aspect of the present invention is to provide a telescoping support rod for the clamp to allow a camera to be supported high above the tripod.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
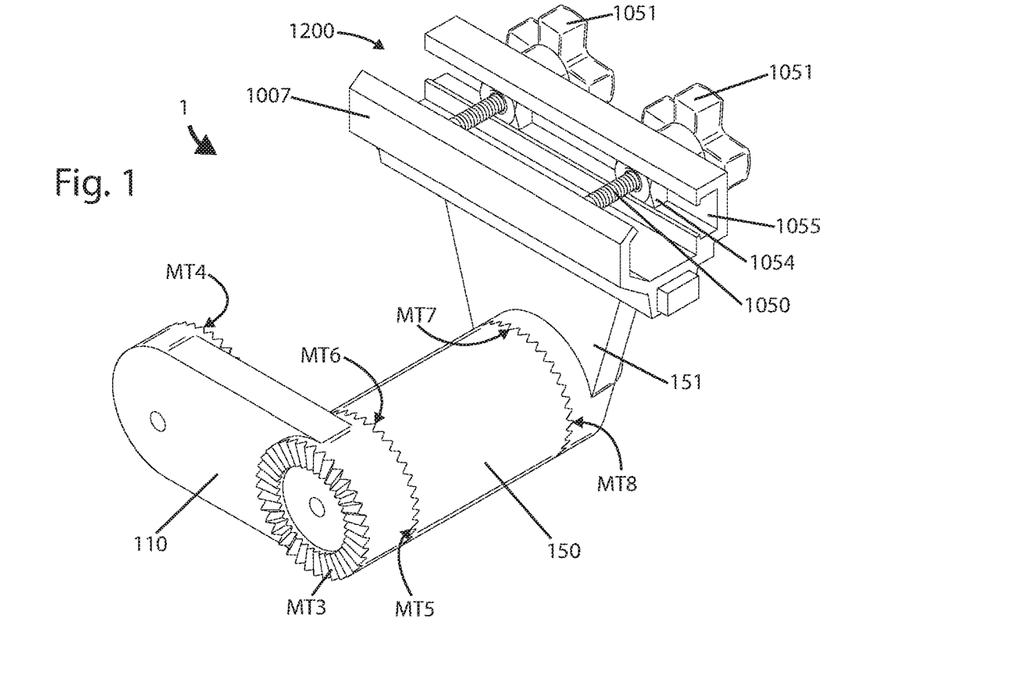
FIG. 1 is a top perspective view of the tripod extender.
Figure 2:
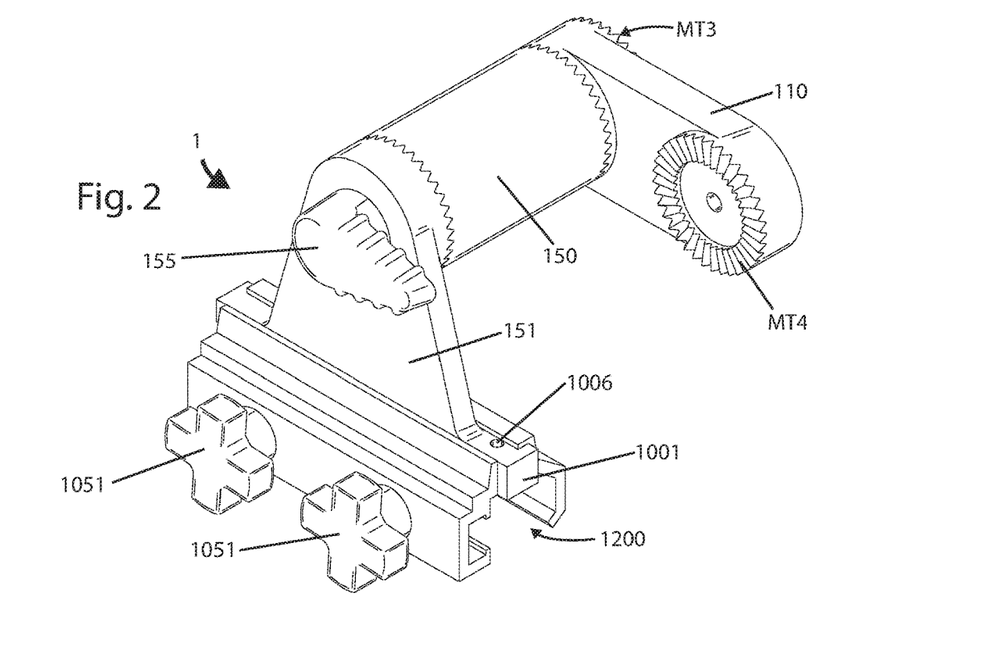
FIG. 2 is a bottom perspective view of the tripod extender.
Figure 3:
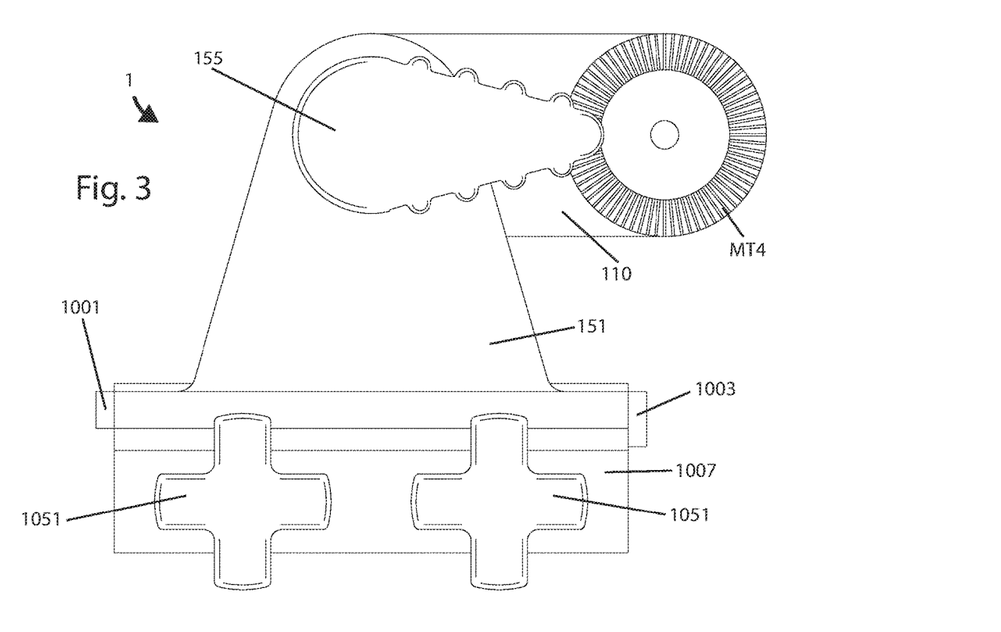
FIG. 3 is a left side elevation view of the tripod extender.
Figure 4:
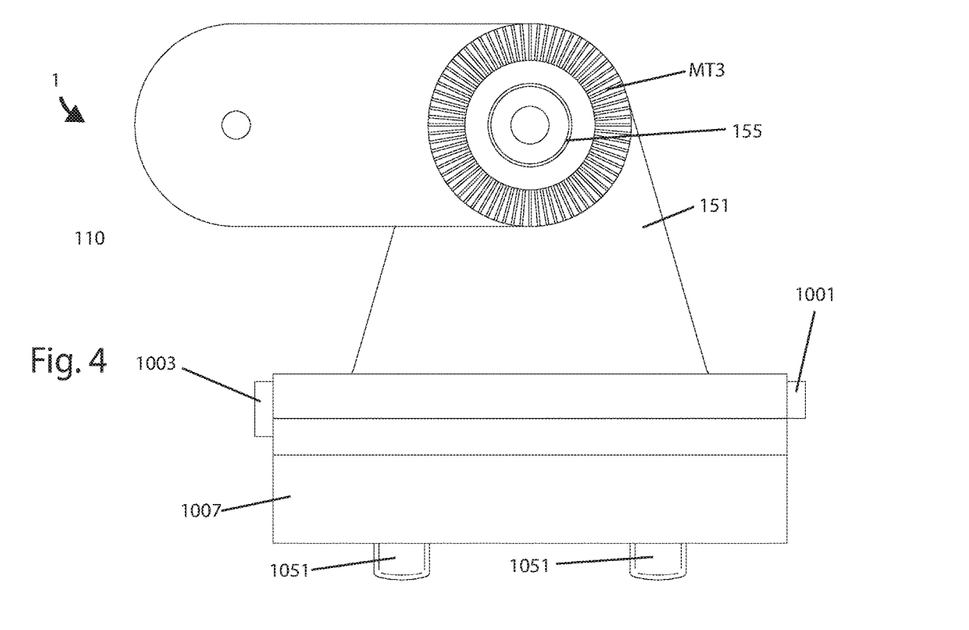
FIG. 4 is a right side elevation view of the tripod extender.
Figure 5:
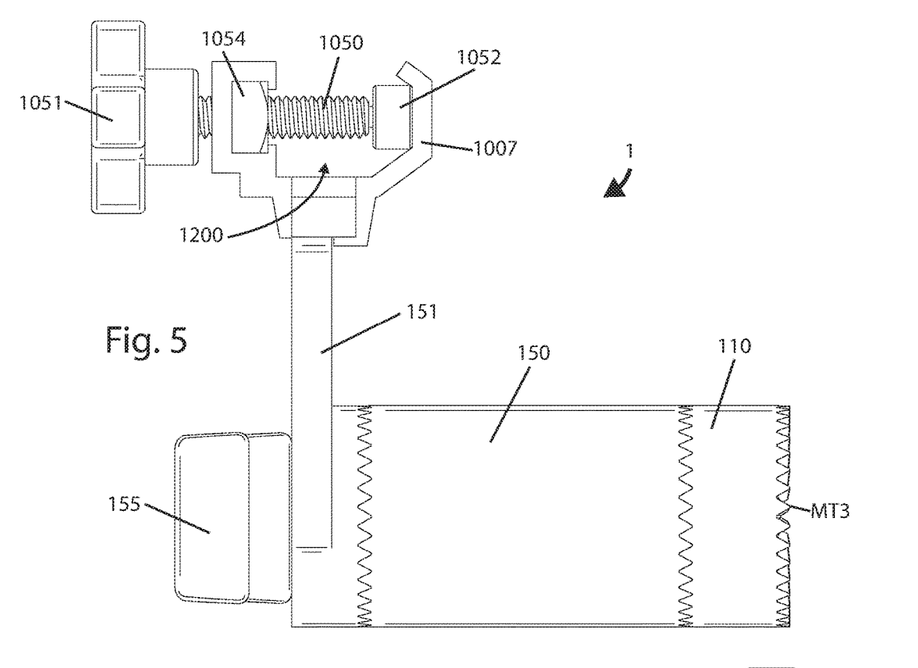
FIG. 5 is a front elevation view of the tripod extender.
Figure 6:
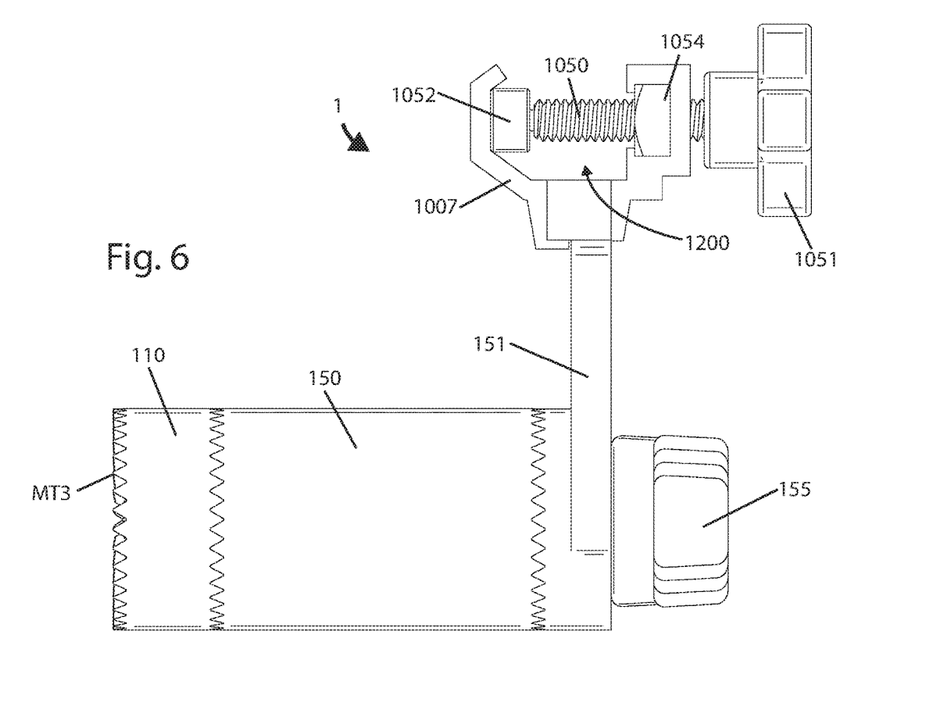
FIG. 6 is a rear elevation view of the tripod extender.
Figure 7:
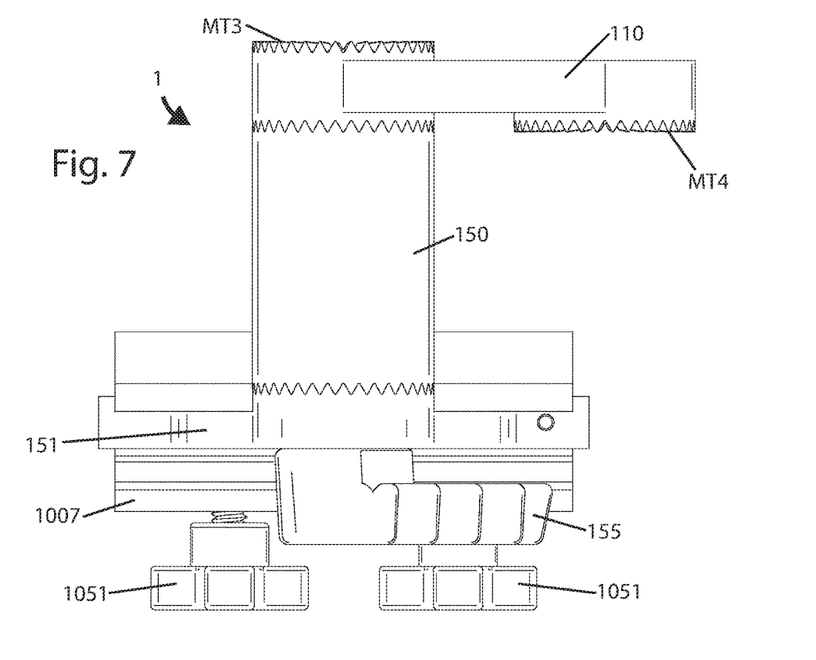
FIG. 7 is a top plan view of the tripod extender.
Figure 8:
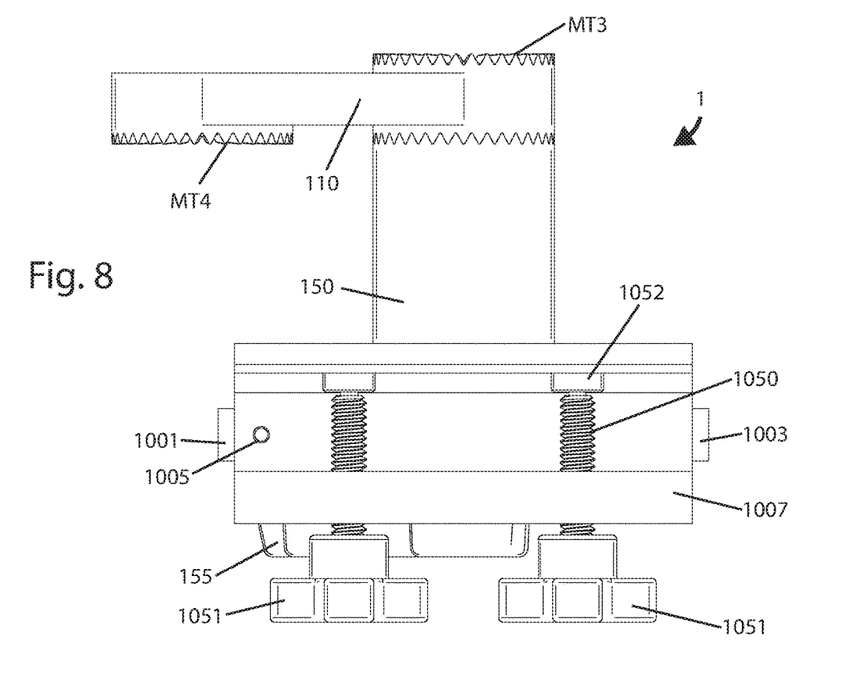
FIG. 8 is a bottom plan view of the tripod extender.
Figure 9:
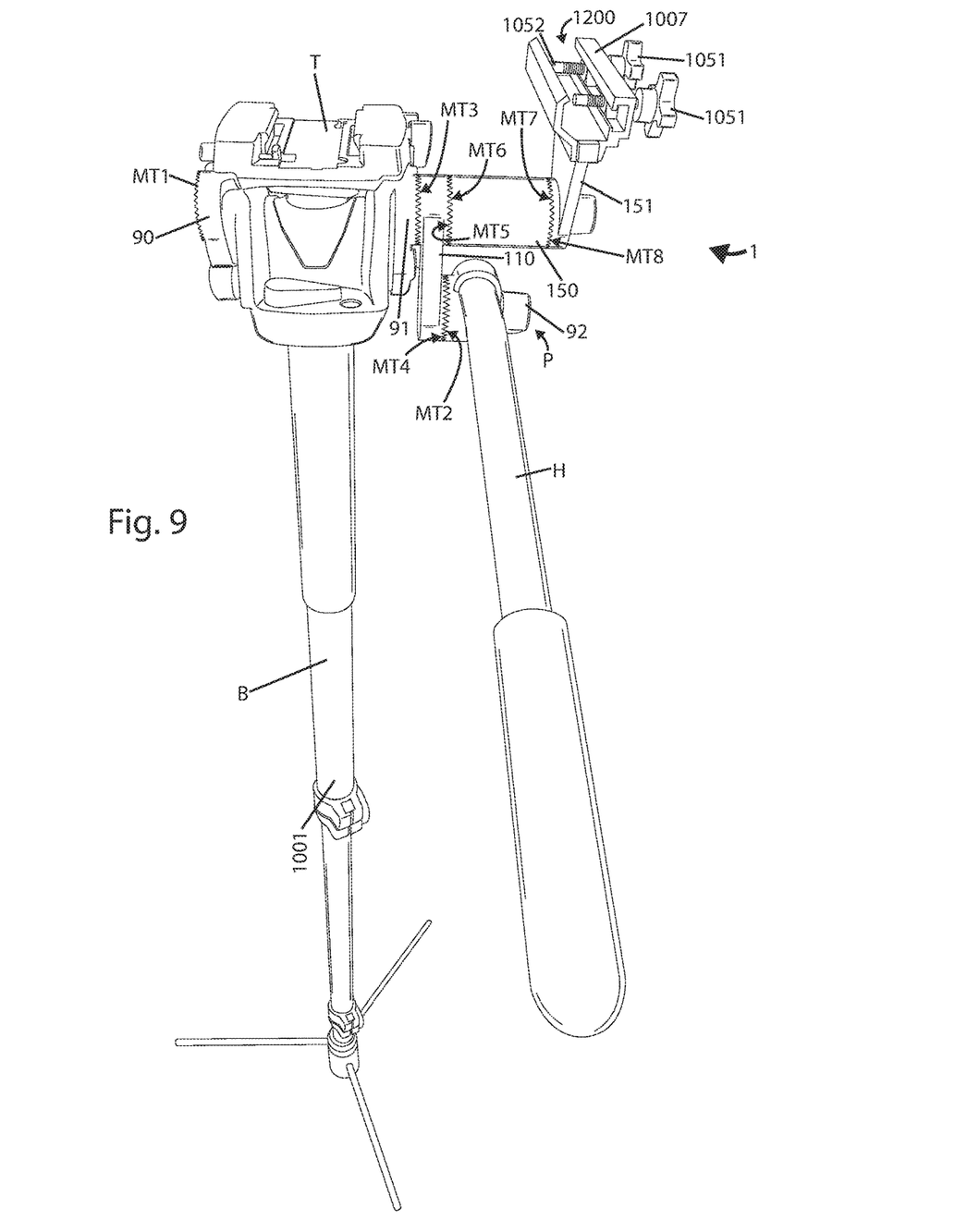
FIG. 9 is a rear perspective view of the tripod extender.

Referring first to FIGS. 1-8 and 11 the tripod clamp 1 is also called a tripod extender. In FIG. 9 the prior art tripod T has a base platform B. Tripod T has a left handle mount 90 and a right handle mount 91. Each handle mount 90, 91 has meshing teeth MT1. In normal use a prior art handle H has its own mount 92 that has mounting teeth MT2 which mesh with meshing teeth MT1. The proximal end P of mount 92 has a knob which fastens a bolt (not shown) into a nut (not shown) in mount MT1.

The present invention removes the prior art mount 92 and handle H. Next a dual mount 110 having meshing teeth MT3 is placed in mount 91 (or 90). The handle H with mounting teeth MT2 is bolted into mount MT4 of the mount 110 via the internal threads 111 shown in FIG. 11.

Figure 11:
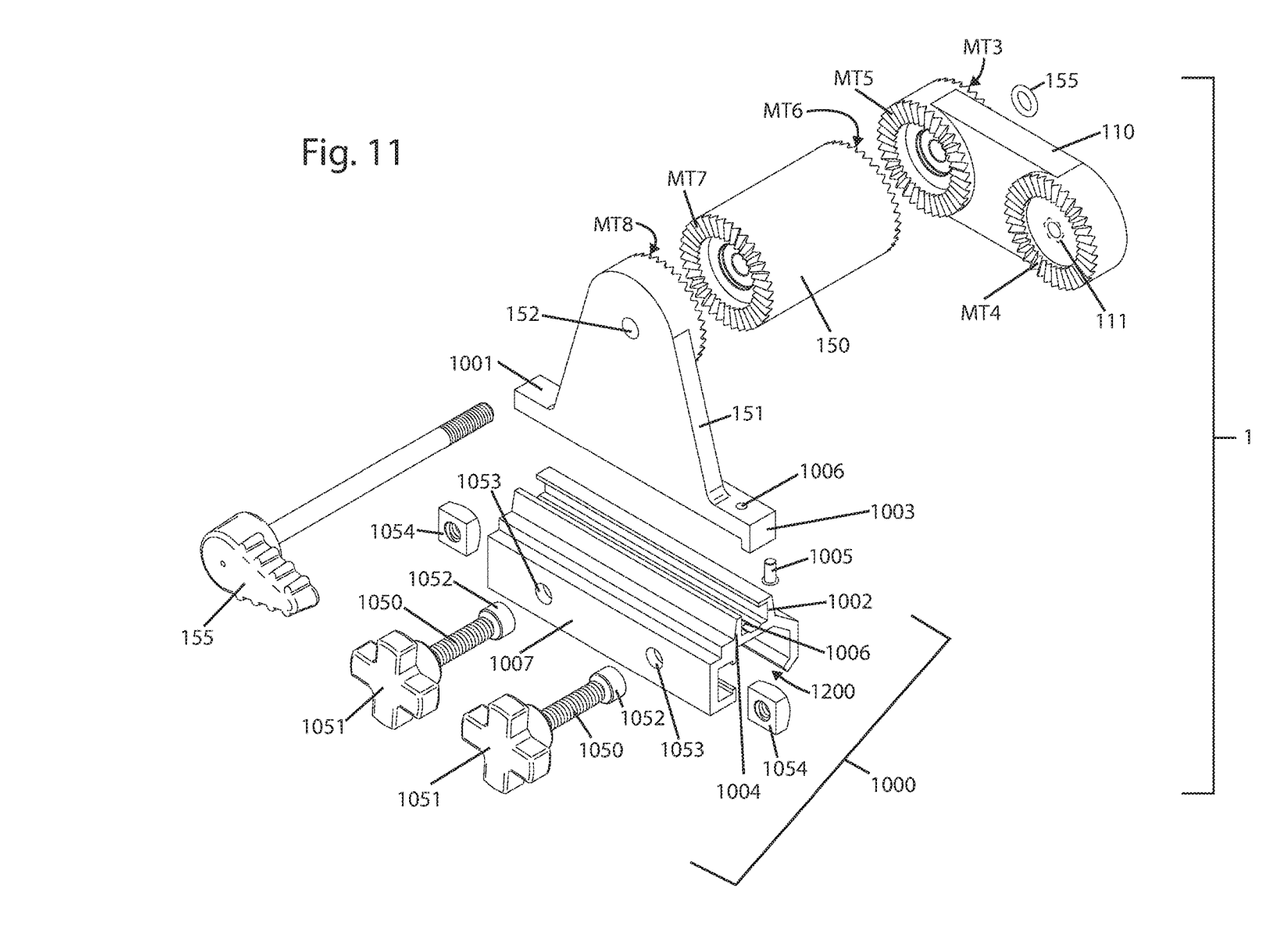
FIG. 11 is an exploded view of the tripod extender.

The extender cylinder 150 has mounting teeth MT6 that mesh into mounting teeth MT5 on the dual mount 110. The clamp bracket 151 has mounting teeth MT8 which mesh into mounting teeth MT7 of the extender 150. An assembly bolt 153 passes through hole 152 and extender 150 and dual mount 110. Threads 154 tighten into the internal prior art threads (not shown) in the mount 91. A gasket 195 seats the dual mount 110 into mount 91. Handle 155 may help the user complete the installation.

Next the clamp assembly 1000 (see FIG. 11) is connected to the clamp bracket 151. The track 1001 slides into the groove 1002 such that the leg 1003 rests against the face 1004 of the groove 1002. A rivet 1005 passes through holes 1006 to lock the clamp housing 1007 via groove 1002 to the track 1001. Two (or more) bolts 1050 have handles 1051 functioning to tighten distal ends 1052 against an accessory. The bolts 1050 pass through holes 1053 and thread into nuts 1054. Nuts 1054 are held in grooves 1055 to enable the user to tighten the distal ends 1052 into an accessory inside the housing groove 1200.

Figure 10A:
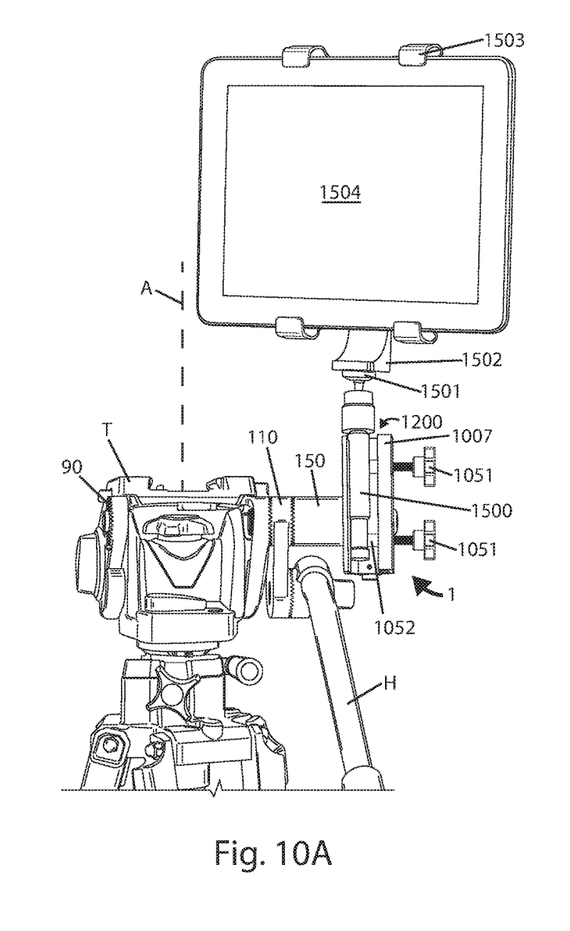
FIG. 10A is a rear perspective view of the tripod extender supporting an iPad® or the like using a telescoping support rod.

Referring next to FIG. 10A the clamp housing 1007 has been mounted vertically in an angle plus or minus about 50° from the vertical axis A of the tripod T. A telescoping base 1500 has been clamped in channel 1200 via distal ends 1052. A top 1501 of base 1500 connects to a platform 1502 that has integral arms 1503 so as to secure the electronic screen 1504 (such as an iPad®).

Figure 10B:
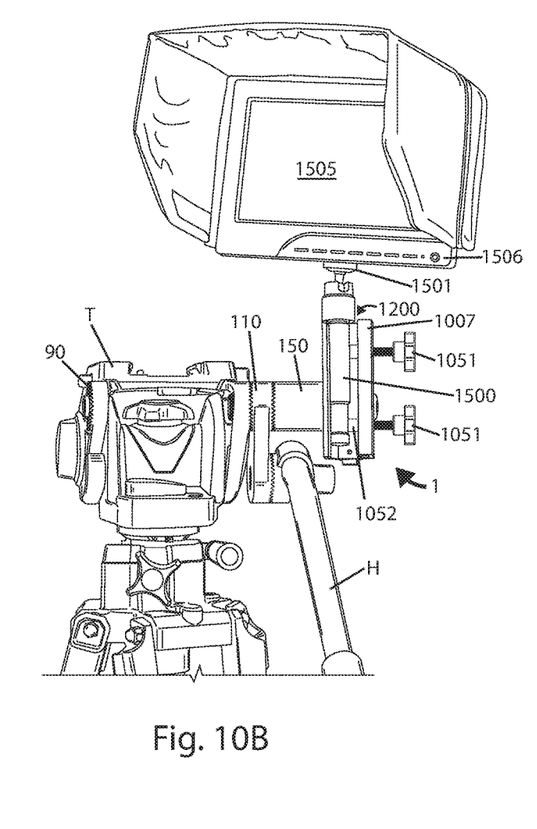
FIG. 10B is a rear perspective view of the tripod extender supporting portable TV using a telescoping support rod.

Referring next to FIG. 10B the top 1501 supports a tray 1506 which may support a small TV 1505. The clamp housing 1007 is the same as shown in FIG. 10A.

Figure 10C:
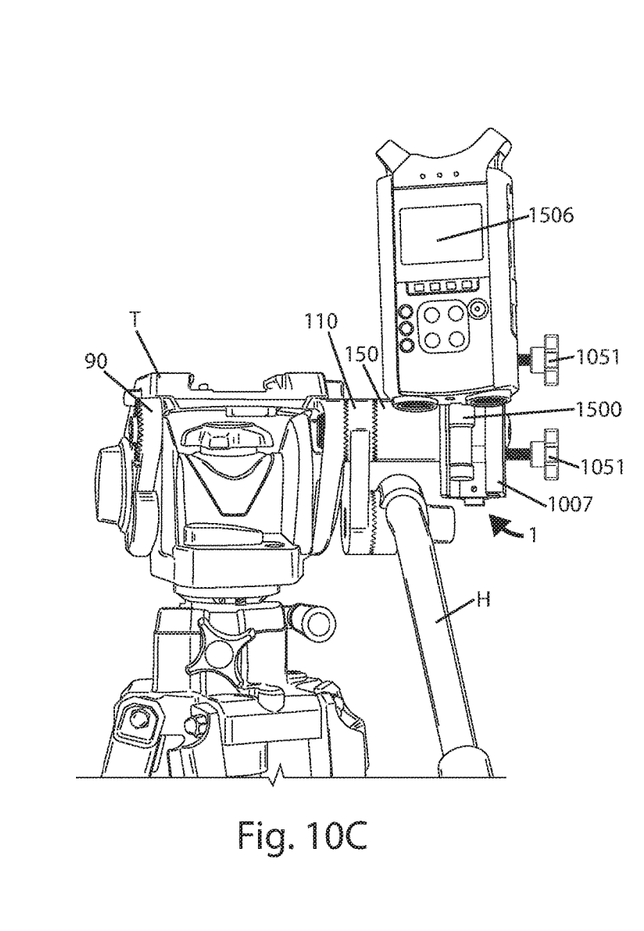
FIG. 10C is a rear perspective view of the tripod extender supporting a smart phone using a support rod.

Referring next to FIG. 10C the housing clamp 1007 is in the same vertical orientation as seen in FIG. 10B. A base (optionally telescoping) 1500 has a connector (not shown) on the back of small phone 1506.

Figure 10D:
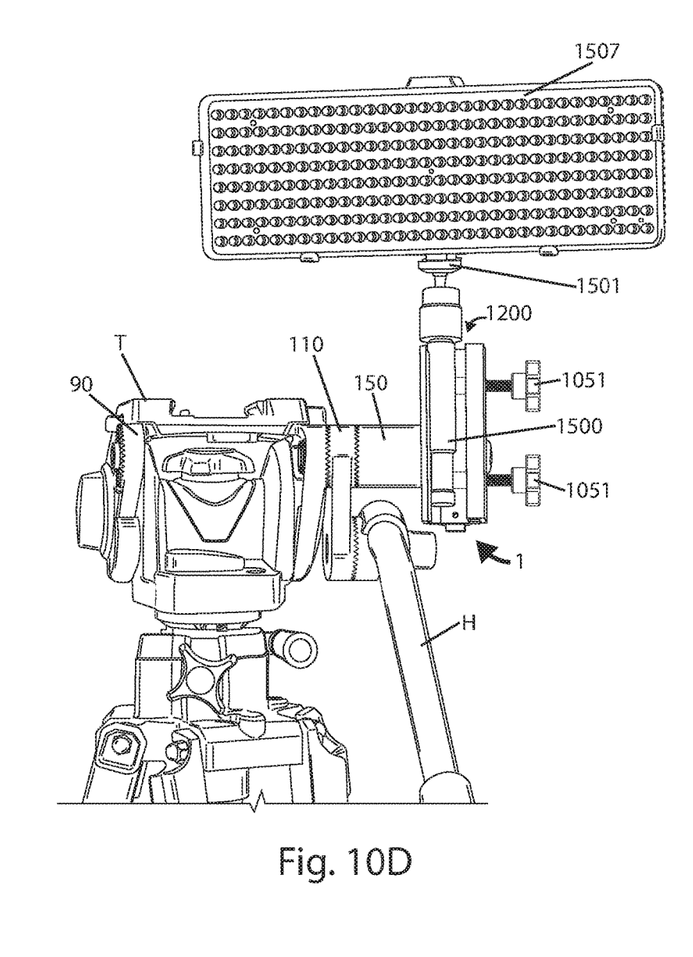
FIG. 10D is a rear perspective view of the tripod extender supporting a light using a telescoping support rod.

Referring next to FIG. 10D the housing clamp 1007 is again oriented vertically. The top 1501 supports an auxiliary lighting panel 1507.

Figure 10E:
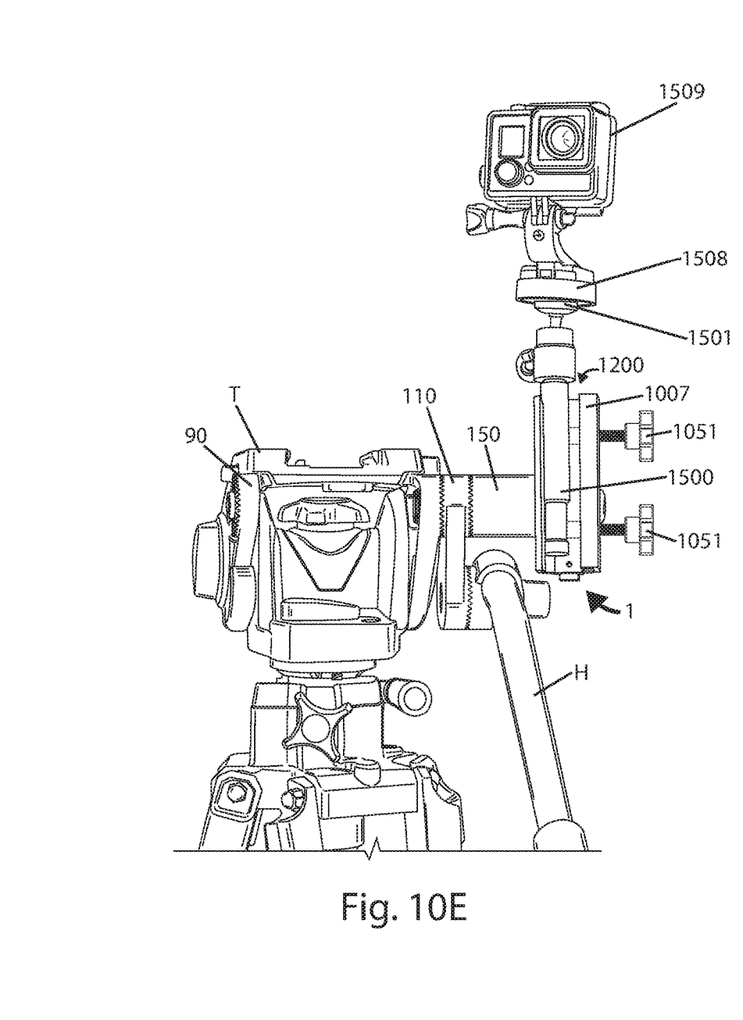
FIG. 10E is a rear perspective view of the tripod extender supporting a camera high above the tripod using a telescoping support rod.

Referring next to FIG. 10E the top 1501 supports a mini-tripod 1508 which secures a camera 1509. If base 1500 is telescoped, then camera 1509 could use several feet above tripod T.

Figure 10F:
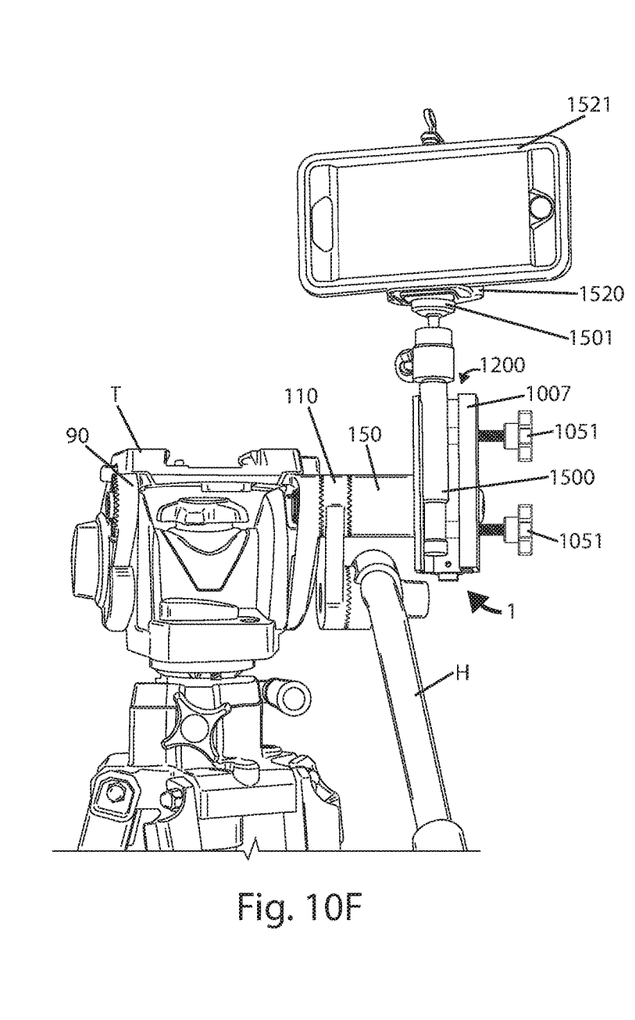
FIG. 10F is a rear perspective view of the tripod extender supporting a portable computer using a telescoping support rod.

Referring next to FIG. 10F the top 1501 has a smart phone brace 1520 which secures a smart phone 1521.

Figure 10G:
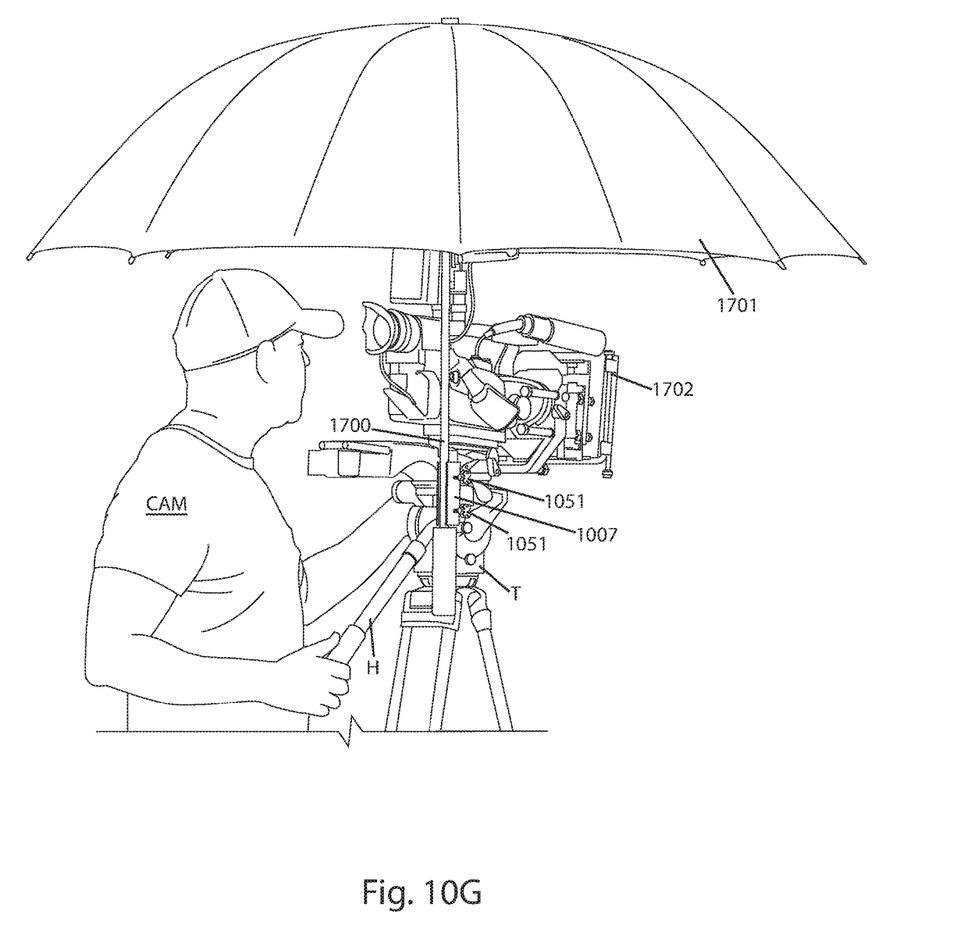
FIG. 10G is a rear perspective view of the tripod extender supporting an umbrella over a photographer and the camera mounted on the tripod.

Referring next to FIG. 10G the photographer CAM has mounted expensive camera equipment 1702 on his tripod T. The housing clamp 1007 of the tripod clamp 1 secures the support rod 1700 of the umbrella 1701. The handle H provides the same control functions for equipment 1702 as it did on the prior art tripod T.

Alternate embodiments (not shown) feature replacing a clamp with an accessory fixture such as forming a circular face with a plurality of teeth on an umbrella handle to bolt the umbrella directly to the extender rod. This embodiment could do away with a clamp.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A tripod accessory platform mountable to a circular face with a plurality of teeth on a side of a tripod, the tripod accessory platform comprising:
    a dual mount arm having an engagement end with a plurality of teeth meshable with the circular face with a plurality of teeth on the side of the tripod;
    said dual mount arm having a circular attachment face co-axially aligned with the engagement end plurality of teeth and facing outbound therefrom;
    said dual mount arm having a distal end with a circular face with a plurality of teeth capable of securing a circular face with a plurality of teeth on a handle;
    an extender rod having an engagement end with a circular face with a plurality of teeth engaging the circular attachment face of the dual mount arm;
    said extender rod having a circular attachment face with a plurality of teeth capable of securing a clamp assembly;
    a bolt securing the clamp assembly to the extender rod to the dual mount arm to the tripod; and
    wherein the clamp assembly further comprises a clamp bracket having a circular engagement face with a plurality of teeth meshable with the circular attachment face of the extender rod.

2. The tripod accessory platform of claim 1, wherein the clamp bracket secures a clamp housing having a housing groove.

3. The tripod accessory platform of claim 2, wherein the clamp housing further comprises opposing side walls with securing grooves.

4. The tripod accessory platform of claim 3, wherein the opposing side walls further comprise at least two securing bolts and receiving nut(s) capable of releasably securing an accessory in the clamp housing.

5. The tripod accessory platform of claim 1 further comprising an umbrella fastened in the clamp assembly.

6. The tripod accessory platform of claim 1, wherein the clamp assembly has a vertical orientation plus or minus about 50° from a vertical axis of the tripod.

7. The tripod accessory platform of claim 6 further comprising a telescoping support rod secured in the clamp assembly.

8. The tripod accessory platform of claim 7, wherein the telescoping support rod further comprises an electronic device.

9. The tripod accessory platform of claim 1 further comprising a light fastened in the clamp assembly.

10. A tripod accessory platform mountable to a circular face with a plurality of teeth on a side of a tripod, the tripod having a mount on top for a camera, the accessory platform comprising:
    a first bracket meshing with the circular face;
    said first bracket having a distal end with an accessory end capable of securing a handle;
    a second bracket extending outbound from the first bracket and having a circular face meshable with an outbound circular face on the first bracket; and
    an accessory fixture secured to the second bracket via meshable circular face and a mounting bolt threaded into the tripod and passing through the first and second brackets.

11. The tripod accessory platform of claim 10, wherein the accessory fixture is a clamp.

12. The tripod accessory platform of claim 11, wherein the clamp secures an umbrella.

13. The tripod accessory platform of claim 10, wherein the accessory fixture further comprises an umbrella handle.

14. The tripod accessory platform of claim 10, wherein the accessory fixture further comprises a mounting rod.

15. The tripod accessory platform of claim 14, wherein the mounting rod is telescoping.

16. A tripod having a top mount for a camera, a tripod accessory holder comprising:
    a bracket extension that can be bolted into a tripod handle receiver on a side of the tripod;
    a handle bolted in a distal end of the bracket extension;
    a cylindrical extension bolted into a proximal end of the bracket extension;
    a clamp bolted to a distal end of the bracket extension furthest from the tripod; and
    said clamp having at least one fastener to enable a securing of a post.

17. The tripod accessory holder of claim 16, wherein the clamp secures an umbrella.

18. The tripod accessory holder of claim 16, wherein the clamp secures a rod.

* * * * *